(12) United States Patent
Garthe et al.

(10) Patent No.: US 9,388,606 B2
(45) Date of Patent: Jul. 12, 2016

(54) CABLE LOCKING SYSTEM (71) Applicant: ABUS August Bremicker Sohne KG, Wetter-Volmarstein (DE)

(72) Inventors: Bernhard Garthe, Gevelsberg (DE); Manuel Thomas, Schwelm (DE)

(73) Assignee: ABUS AUGUST BREMICKER SOHNE KG, Wetter-Volmarstein (DE)

( * ) Notice: Subject to any disclaimer, the term of this patent is extended or adjusted under 35 U.S.C. 154(b) by 0 days.

(21) Appl. No.: 14/701,284

(22) Filed: Apr. 30, 2015

(65) Prior Publication Data

US 2015/0315822 A1    Nov. 5, 2015

(30) Foreign Application Priority Data

May 5, 2014  (DE) .......................... 10 2014 106 227

(51) Int. Cl.
| E05B 73/00 | (2006.01) |
| E05B 65/00 | (2006.01) |
| E05B 67/36 | (2006.01) |

(52) U.S. Cl.
CPC ............ *E05B 73/0005* (2013.01); *E05B 65/00* (2013.01); *E05B 67/36* (2013.01); *Y10T 70/402* (2015.04)

(58) Field of Classification Search
CPC ..... E05B 65/00; E05B 67/003; E05B 63/143; E05B 67/383; G05G 5/005; Y10T 70/483; Y10T 70/40; Y10T 70/409; Y10T 70/5611; F16P 3/08
USPC .................. 70/14, 18, 19, 51, 53, 58, DIG. 63
See application file for complete search history.

(56) References Cited

U.S. PATENT DOCUMENTS

| 539,650 | A | * | 5/1895 | Searle ..................... E05B 75/00 70/15 |
| 558,814 | A | * | 4/1896 | Hunt ....................... E05B 7/003 70/49 |
| 1,475,256 | A | * | 11/1923 | Belair .................... E05B 67/003 24/134 R |
| 1,660,040 | A | * | 2/1928 | Lehtonen ................ F16G 11/10 24/134 KB |
| 2,190,661 | A | * | 2/1940 | Hauer .................... E05B 67/003 24/132 R |
| 3,017,678 | A | * | 1/1962 | Christensen ............ B23B 21/08 24/134 R |
| 3,667,259 | A |   | 6/1972 | Reque et al. |
| 3,824,653 | A | * | 7/1974 | Sholler ................... F16G 11/10 24/134 KB |

(Continued)

FOREIGN PATENT DOCUMENTS

DE    202006006223 U1    7/2006

*Primary Examiner* — Suzanne Barrett
(74) *Attorney, Agent, or Firm* — Amster, Rothstein & Ebenstein LLP (57) ABSTRACT

A cable locking system comprises a housing, a cable whose one end is fastened or fastenable to the housing and whose other end can be introduced into a cable passage formed in the housing, a clamping device for clamping the cable in the cable passage and an actuation element which is adjustable between a closed position, in which the actuation element is fastenable to the housing by means of locking elements, in particular padlocks, and an open position in order selectively to adjust at least one clamp jaw of the clamping device between a holding position clamping the cable in the cable passage and a release position releasing the cable. The adjustment of the clamp jaw between the holding position and the release position comprises a pivot movement.

27 Claims, 9 Drawing Sheets

(56) References Cited

U.S. PATENT DOCUMENTS

| | | | | |
|---|---|---|---|---|
| 4,878,270 A | * | 11/1989 | Westerkamp | F16G 11/04 24/132 R |
| 4,912,817 A | * | 4/1990 | Sandreid | F16G 11/10 24/132 R |
| 5,003,797 A | * | 4/1991 | Wirth | F16K 35/10 137/385 |
| 5,517,835 A | * | 5/1996 | Smith | E05B 73/0005 70/14 |
| 5,791,170 A | * | 8/1998 | Officer | E05B 67/003 70/14 |
| 5,823,020 A | * | 10/1998 | Benda | E05B 67/003 24/132 R |
| 6,212,919 B1 | * | 4/2001 | Gerow | E05B 67/003 24/132 R |
| 6,526,785 B1 | * | 3/2003 | Asenstorfer | A63C 11/006 70/18 |
| 6,609,399 B1 | * | 8/2003 | Daniels, Jr. | B62H 5/003 70/14 |
| 6,629,440 B1 | * | 10/2003 | Meekma | A63C 11/006 70/14 |
| 6,755,054 B2 | | 6/2004 | Burmesch et al. | |
| 7,293,438 B2 | * | 11/2007 | Benda | F16G 11/04 24/132 WL |
| 7,784,313 B2 | * | 8/2010 | Wyers | E05B 67/003 70/14 |
| 8,528,370 B2 | * | 9/2013 | Yu | E05B 67/003 70/14 |
| 9,032,764 B2 | * | 5/2015 | Yeh | E05B 65/00 70/14 |
| D736,058 S | * | 8/2015 | Garthe | D8/330 |
| D738,187 S | * | 9/2015 | Garthe | D8/330 |
| 2006/0042329 A1 | | 3/2006 | Benda | |
| 2006/0053845 A1 | * | 3/2006 | Benda | E05B 7/006 70/18 |
| 2011/0041569 A1 | | 2/2011 | Yu et al. | |
| 2015/0315822 A1 | * | 11/2015 | Garthe | E05B 73/0005 70/15 |

\* cited by examiner

CABLE LOCKING SYSTEM

The present invention relates to a cable locking system, in particular for the locking of machines, of devices or of plants on servicing, cleaning or maintenance, comprising a housing; a cable whose one end is fastened or fastenable to the housing and whose other end can be introduced into a cable passage formed in the housing; a clamping device for clamping the cable in the cable passage in order to stop a displacement of the cable in the cable passage in at least one cable removal direction; and an actuation element which is associated with the clamping device and which is adjustable between a closed position, in which the actuation element can be fixed to the housing by means of locking elements, in particular padlocks, and an open position in order selectively to adjust at least one clamp jaw of the clamping device between a holding position clamping the cable in the cable passage and a release position releasing the cable.

On the servicing, the cleaning or the maintenance of industrial plants and the like, it is important to prevent an unexpected switching on or starting of devices and of machines in order to ensure a safe working and to avoid accidents. This can take place through different measures of the lockout-tagout, such as a marking of switches or of valves by means of warning signs, which is also called "tagout", or a locking of switches or of valves by means of locks, which is also called a "lockout". Cable locking systems can in particular be used for the locking of valves, of disconnectors, of circuit breakers and the like within the framework of a lockout measure, in that e.g. the cable is led through the hand wheel of a valve and is additionally led around a fixed component, is tightened and is closed into a loop by means of the housing. Every person participating in the servicing attaches a padlock to the housing of the cable locking system before entering the danger zone and removes the padlock again after the completion of the work. In this manner it is ensured that the cable is only released and accordingly the lock is only cancelled when all persons have left the danger zone. A simple operability of the cable locking system is of great importance in this respect.

A cable locking system in accordance with the preamble of claim 1 is, for example, disclosed in U.S. Pat. No. 6,755,054 B2. In this system, two slidingly guided clamp jaws, between which the cable is present, are pushed towards one another for the clamping of the cable. It has been found that with such cable locking systems damage of the cable surface frequently results, in particular then when the clamp jaws have toothed arrangements. Damage of the insulation sleeve of a cable is particularly critical with respect to the electric safety. An omission of the toothed arrangements for the protection of the cable surface, in contrast, usually has the consequence that, despite the clamping, the cable can be pulled out of the cable passage with a corresponding exertion of force, which is undesired for safety reasons. A further problem with such cable locking systems consists therein that the clamp jaws are frequently difficult to access and for this reason difficult to clean such that dirt and moisture adhere to them. In addition, such cable locking systems are frequently complex and their operation is not revealed to the user in an intuitive manner.

It is an object of the invention to enable, with cable locking systems of the initially named kind, a reliable clamping of the cable on simultaneous sparing of the cable surface and a simpler, more intuitive operation by the user, using simple means.

The object is satisfied by a cable locking system having the features of claim 1.

In accordance with the invention, the adjustment of the at least one clamp jaw between the holding position and the release position comprises a pivot movement about a respective pivot axis. The clamp jaw is therefore pivoted towards the cable in order to press the cable against a fixed contact surface or against a further, adjustable clamp jaw, in particular a clamp jaw adjustable in an analogous manner, and thereby to clamp the cable. Since the clamp jaw contacts the cable in a pivoting movement, the squashing of the cable is overall more gentle and the cable surface is spared. The pivotable clamp jaw can furthermore be arranged beside the cable passage such that the cable passage is easily accessible, for example for removing dirt particles, greases or grease oils.

The movement of the clamp jaw between the holding position and the release position can in principle be composed of a plurality of components, this means, in addition to the pivot movement, the movement can comprise a linear displacement movement superimposed on the pivot movement. However, the clamp jaw is preferably supported at the housing pivotable about a fixed pivot axis; this means the movement of the clamp jaw between the holding position and the release position exclusively consists in a pivot movement. The at least one clamp jaw can for this purpose be supported at a support spigot provided in the housing. This allows a particularly simple manufacture.

In the holding position, a section of the clamp jaw engages into the cable passage in such a way that a sufficient clamping force is exerted onto the cable present in the cable passage. In this way it is possible that the clamping section of the clamp jaw only slightly reaches into the cable passage. It is likewise not absolutely necessary that the clamp jaw is completely pivoted out of the cable passage for releasing the cable. In accordance with a preferred embodiment of the invention, the at least one clamp jaw can, however, be completely pivoted out of the cable passage by a movement of the actuation element into the open position. This is advantageous in so far that, with a clamp jaw present in the release position, the cable has a completely free motion in both directions and is accordingly spared on a pulling out of the housing.

The at least one clamp jaw can comprise an eccentric cam having a clamp jaw surface which has a convexly curved progression in a sectional plane extending transversely with respect to the pivot axis. Due to the convexly curved progression, the cable clamping surface so-to-say contacts the cable in a rolling manner such that no damage by edges is to be feared.

The cable clamping surface preferably has grooves and/or teeth in order to increase the holding force. Such grooves or teeth can have a width extent which extends at least substantially in parallel with the pivot axis. The cable clamping surface can also have a groove-like recess which extends along the cable progression in order at least partly to engage around the cable and thereby to guide it, with the grooves or the teeth, however, preferably also being present in the region of the recess.

A specific embodiment of the invention provides that the grooves and/or the teeth are oriented in such a way that they are set against the cable removal direction in the holding position. A tension at the cable in the cable removal direction thus has the result that the engagement of the grooves and/or of the teeth into the cable surface is even strengthened further. In contrast to this, the grooves and/or the teeth can easily rotate out of the cable surface on a tension at the cable against the cable removal direction such that a slight retightening is possible.

The clamping device is preferably configured in such a way that, in the holding position, a displacement of the cable is blocked in the cable removal direction and is possible against the cable removal direction. The clamp jaw thus blocks a displacement of the cable in the cable removal direction but allows a displacement of the cable against the cable removal direction. The cable is thus readjustable. If a user determines that the cable is not seated tightly enough after the fixing of the actuation element to the housing, the cable can be retightened at any time without the padlocks having to be removed in a cumbersome manner. On a tension at the cable in the cable removal direction, the clamp jaw can, in contrast, be wedged even further towards the cable and the cable is securely clamped. Due to the wedging, a high clamping effect can also be achieved with a relatively small clamping surface.

The at least one clamp jaw is preferably preloaded by a spring device, in particular by a round spring or by a torsion spring, in the direction of the holding position. The clamping device is preferably configured in such a way that the at least one clamp jaw is automatically pivoted against the preload from the holding position in the direction of the release position by means of a displacement of the cable against the cable removal direction. In this way it is ensured that the cable is always blocked with respect to a displacement movement in the cable removal direction, provided that the clamp jaw is not directly conveyed into the release position.

In accordance with an embodiment of the invention, the clamping device comprises at least two clamp jaws which are arranged at both sides of the cable passage and are each pivotable between a holding position clamping the cable in the cable passage and a release position releasing the cable. The two clamp jaws can in particular form a ratchet in the manner of a cam cleat or a bulldog cam cleat and wedge on a tension at the cable present between them in the cable removal direction. However, on a tension at the cable in the opposite direction, they slide over the cable surface and release the cable for retightening.

A further embodiment of the invention provides that the adjustment of the actuation element between the closed position and the open position comprises a pivot movement about an adjustment axis. The conversion of the movement of the actuation element into a corresponding movement of the clamp jaw is thus particularly simple.

The actuation element can in particular be configured as an actuation lever pivotable about the adjustment axis. Such an actuation lever is easy and intuitive to operate.

A particularly simple and direct force transmission between the actuation element and the clamp jaw is then possible when the adjustment axis extends in parallel with the at least one pivot axis of the at least one clamp jaw. However, the clamp jaw can also be directly connected to the actuation element in a drive effective manner and thereby be pivotable. With such an embodiment, the pivot axis of the at least one clamp jaw converges with the adjustment axis of the actuation element.

A further embodiment of the invention provides that the actuation element is at least partly arranged in a cut-out formed in the housing, with the pivot movement of the actuation element about the adjustment axis being bound in at least one direction by a respective wall section of the cut-out. The pivot movement of the actuation element about the adjustment axis is preferably bound in both directions by the respective wall sections of the cut-out. The end positions of the actuation element defined by the boundaries can precisely correspond to the open position, on the one hand, and to the closed position, on the other hand, whereby the operability of the clamping device is facilitated. The pivot movement of the actuation element is preferably limited to an angular range of at most 120° and preferably of at least substantially 90°.

A further embodiment of the invention provides that an adjustment element is provided which is connected in a drive effective manner to the adjustment element and which is supported at the housing rotatable about the adjustment axis, with at least one cam, in particular a cam disk, with the adjustment element cooperating with the respective clamp jaw via the respective cam in such a way that, on a pivoting of the actuation element into the open position, the respective clamp jaw is pivoted into the release position, in particular against a preload. A pivot movement of the actuation element can be converted into a pivot movement of the clamp jaw in a particularly simple manner by means of such an adjustment element. The adjustment element and the at least one clamp jaw are preferably arranged in different planes and/or axial positions with respect to the adjustment axis.

It is preferred that the respective cam of the adjustment element does not contact the respective clamp jaw when the actuation element is present in the closed position. The clamp jaw can then contact the cable free from the influence of the adjustment element and in particular only under the influence of a preload.

The adjustment element can also comprise two cams disposed opposite with respect to the adjustment axis. The radial extent of the two cams in the closed position can in each case extend at least substantially in parallel with the cable passage. The simultaneous actuation of two clamp jaws is thereby possible, in particular in an embodiment of the clamping device in the manner of a cam cleat as described above.

Furthermore, a projection can be arranged at an end surface of the at least one clamp jaw, with which projection the cam of the adjustment element cooperates. The adjustment element can thus be arranged in a different plane and/or axial position than the clamp jaw with respect to the adjustment axis, that is, for example above or beneath the cable passage.

In accordance with a specific embodiment, the actuation element comprises a shaft whose longitudinal axis corresponds to the adjustment axis, with the rotatable adjustment element being rotationally fixedly connected to the shaft, in particular via a tongue and groove connection, and/or being axially fixedly held at the shaft via a securing element, in particular via a circlip. The actuation element and the adjustment element are thus coupled directly to one another and can be pivoted together. This allows a particularly simple construction.

The actuation element can preferably be latched to the housing in the open position and/or in the closed position. A particularly simple operation of the cable locking system is thereby possible. The actuation element can thereby be held in the open position and/or in the closed position. The latchability can be provided in a simple manner by latching noses provided at the housing, which snap into corresponding latching depressions of the actuation element.

The actuation element preferably comprises a plurality of locking apertures which are flush with corresponding locking apertures formed in a locking section of the housing when the actuation element is present in the closed position, such that the actuation element can be fixed to the housing by means of locking elements, in particular padlocks. The more locking apertures are provided, the more persons can block the cable locking system through attachment of their own padlock. Preferably at least five and particularly preferably at least six locking apertures are provided. This has proven to be favourable for many applications.

In accordance with a further embodiment of the invention, the one end of the cable can be releasably fastened to the housing. In this way the cable can be exchanged as required, for example in the event of damage or if a cable of different cable length is desired. It is understood that this aspect is independent of the specific design and arrangement of the clamping device. Accordingly, the aspect of the releasably fastenable cable end is also claimed independently of the features of the characterizing portion of claim 1.

In order to effect such a releasable fastening possibility, a head part can be fastened releasably or permanently to the end of the cable provided for the releasable fastening to the housing, wherein, in a direction of assembly, the cable, but not the head part, can be led through a receiver for the end of the cable provided with the head part, said receiver being formed in a holding device of the housing. The cable can accordingly be threaded through the holding device, wherein it is held at the housing in a shape-matched and secure manner via the head part. The head part can, for example be fastened to the cable via a screw connection or via a clamp connection.

The holding device can comprise a holding element in which the receiver is formed and which is pivotably supported in the housing between an operating position and an assembly position. In the operating position, the cable is fastened to the housing in a captive manner. An assembly or a cable exchange is accordingly only possible when the holding element has been pivoted into the assembly position. The handling of the cable locking system can hereby be simplified. In the assembly position, the head part can in particular be removed from the receiver away from the direction of assembly. If required, the cable can thus be pulled out of the receiver despite the head part and can thereby be removed from the housing, provided that the other end of the cable has been accordingly released.

In accordance with an embodiment, a pivot recess is formed in the housing for the end of the cable provided for the releasable fastening to the housing, which pivot recess is sufficiently large to allow a pivot movement of the end of the cable fastened to the housing. The pivot recess can accordingly be formed as an elongate slit.

It is preferred if boundary sections of the pivot recess form abutments for the cable and thereby bound the pivot movement of the holding element when the end of the cable is fastened to the housing. This facilitates the adjustment of the holding element between the operating position and the assembly position for a user. The pivot movement of the holding element is preferably limited to an angular range of at most 120° and particularly preferably to at least substantially 90°.

A removal opening can be formed in the housing through which the head part can be removed together with the cable from the housing away from the direction of assembly. The end of the cable is preferably only then removable from the housing via the removal opening when the holding element is in the assembly position.

A specific embodiment of the invention provides that a plurality of cables of different lengths are provided which are selectively releasably fastenable to the housing by means of the respective one end. A user can thus select a cable which is adapted to the respective application from a set of cables of different lengths and fasten this cable to the housing. Such a cable locking system can be used in a particularly flexible manner. Alternatively, the head part can—if it is releasably fastened to the cable—be removed from the one end of the cable in order subsequently to shorten the cable and finally to fasten the head part to the cable again.

A further aspect of the invention which is claimed independently of the embodiment of the clamping device provides that the housing comprises a head section and a first locking section which is connected to the head section via an intermediate section and which is formed as a plate-shaped prolongation, wherein the clamping device is arranged in the head section and locking apertures are formed in the first locking section, and wherein the actuation element is configured as an actuation lever which is pivotable about the adjustment axis and which comprises, at one free end, a plate-shaped second locking section having a plurality of locking apertures formed therein which are flush with the locking apertures of the first locking section when the actuation lever is present in the closed position, such that the actuation lever can be fixed to the housing by means of the locking elements.

Due to this design, in particular due to the position and the form of the two locking sections, a user is reminded of the design of a classic "safety hasp" known to him, as it is, for example, known from U.S. Pat. No. 3,667,259. The operation of the clamping device is thus revealed in an intuitive manner to the user who is confronted with the cable locking system in accordance with the invention for the first time, since the user already knows how to operate this system from the classic "safety hasp". In other words, the user recognizes the function of the cable locking system at first glance even if the present cable locking system is not available to him in a physical form, but he is rather only confronted with it in the form of an image. This recognisability enables a particularly simple and intuitive operation which, in turn, is accompanied by an increased safety.

It can be provided that the head section is rounded in circular form in a plane extending at least substantially perpendicular to the adjustment axis over an angular range of more than 180°, in particular of more than 200°, preferably of more than 220°, particularly preferably of at least substantially 240°. The intuitive operation of the clamping device can therefore be reinforced further on the basis of the dependence on the known design of a classic safety hasp.

The two locking sections can at least be of substantially identical design and/or each have a rectangular shape, preferably with rounded corners. This comes even closer to the analogy with a safety hasp.

A further embodiment of the invention provides that, in comparison with the head section and with the first locking section, the intermediate section has a reduced width in a plane extending perpendicular to the adjustment axis and in a direction extending perpendicular to the longitudinal direction of the actuation lever present in the closed position, with the width of the actuation lever in a region corresponding to the intermediate section of the housing preferably not exceeding the reduced width. Such a "tapering" is present in many classical safety hasps such that the recognisability can be further increased.

Further developments of the invention are also set forth in the dependent claims, in the description and in the enclosed drawings.

The invention will be described in the following by way of example with reference to the drawings.

Figure 1:
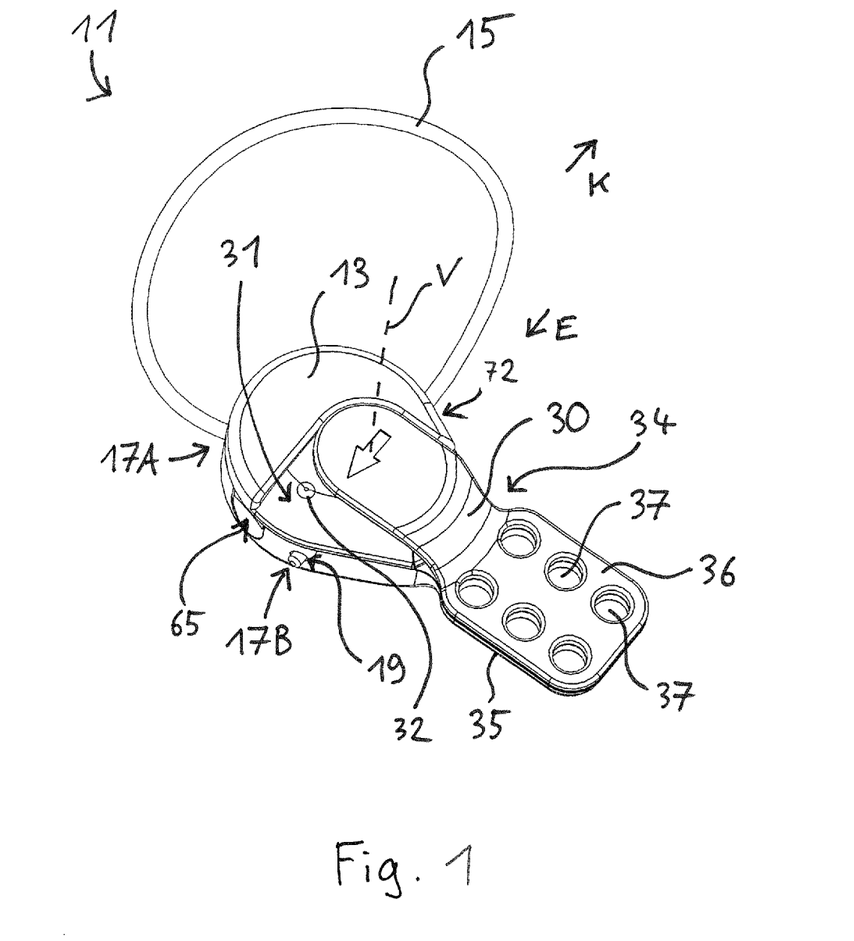
FIG. 1 is a perspective illustration of a cable locking system in accordance with the invention, with an actuation element of the cable locking system being present in a closed position.
Figure 2:
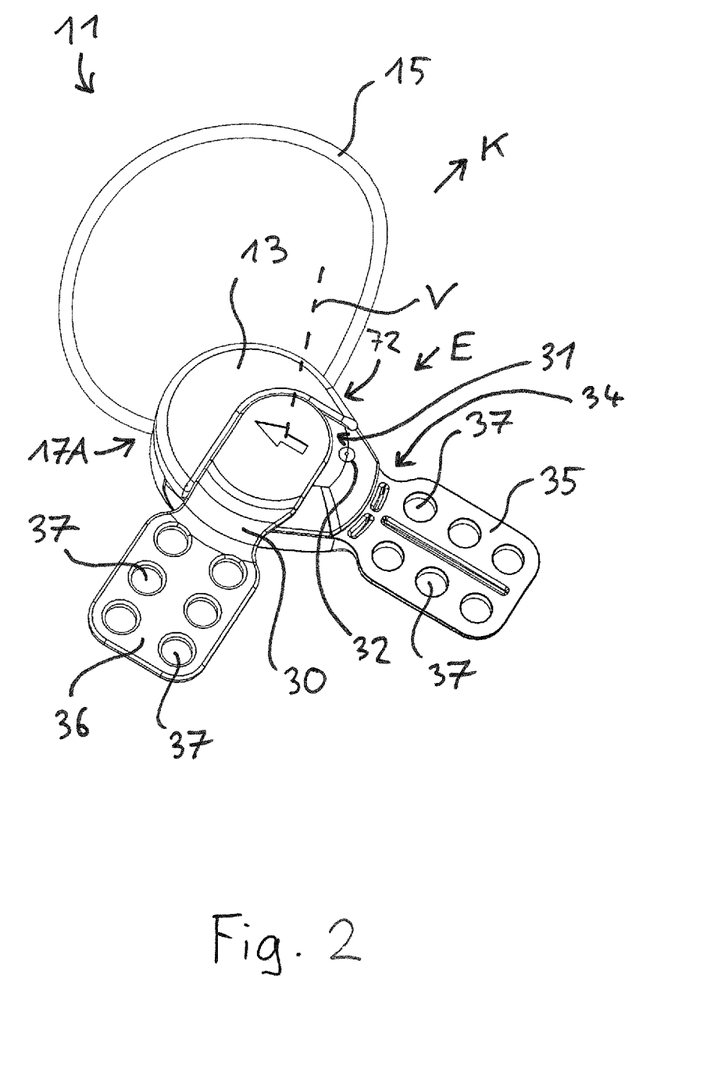
FIG. 2 shows the cable locking system in accordance with FIG. 1, with the actuation element being present in an open position.

The cable locking system 11 shown in FIGS. 1 and 2 comprises a housing 13 and a cable 15. The end 17A of the cable 15 disposed at the top left in the Figure is fastened to the housing 13, whereas the other end 17B of the cable 15 is led through a cable passage 19 which is formed in the housing 13. This end 17B of the cable 15 can be introduced into the cable passage 19 in a direction of introduction E through an introduction opening 25 visible in FIG. 5 and can exit from the housing 13 again through an oppositely disposed exit opening 27. An actuation lever 30 pivotable about an adjustment axis V serves to fix the cable 15, as required, in the cable passage 19 in such a way that the cable can be displaced in the direction of introduction E, but not in the opposite cable removal direction K. For this purpose, a clamping device 33 is arranged in the housing 13, which clamping device will be described in more detail in the following.

The housing 13 comprises a head section 72 and a first locking section 35 which is connected to the head section 72 via an intermediate section 34 and which is formed as a plate-shaped prolongation. The head section 72 surrounds the interior space of the housing 13 in which the clamping device 33 is arranged. The plate-shaped first locking section 35 is penetrated by a plurality of locking apertures 37—in this instance six locking apertures arranged in pairs.

The actuation lever 30 comprises, at one free end, a plate-shaped second locking section 36 which is likewise penetrated by a plurality of locking apertures 37—here six locking apertures arranged in pairs. As can be seen from FIG. 1, the locking apertures 37 of the second locking section 36 are flush with the locking apertures 37 of the first locking section 35 when the actuation lever 30 is present in the closed position (FIG. 1). As shown, the two locking sections 35, 36 are of substantially identical design and each have a rectangular shape with rounded corners. Specifically the first locking section 35 and the second locking section 36 each have an aspect ratio which can vary in dependence on the number of present locking apertures 37 from 1:2 to 1:1. In the illustrated embodiment having two times three locking apertures 37, the aspect ratio can, for example, be approximately 4:5, whereas, in the case of two times four locking apertures 37, the aspect ratio can be approximately 4:6, wherein the aspect ratio is additionally influenced by the diameter of the locking apertures 37.

It can be seen from FIG. 1 that the head section 72 is rounded in circular form in a plane extending at least substantially perpendicular to the adjustment axis V over an angular range of approximately 240°. In comparison with the head section 72 and with the first locking section 35, the intermediate section 34 has a reduced width in a plane extending perpendicular to the adjustment axis V and in a direction extending perpendicular to the longitudinal direction of the actuation lever 30 present in the closed position, with the width of the actuation lever 30 in a region corresponding to the intermediate section 34 of the housing 13 not exceeding this reduced width but rather corresponding to it.

The actuation lever 30 which is pivotable with respect to the housing 13 and the non-pivotable first locking section 35 form two limbs in the manner of scissors or in the manner of pliers. When the actuation lever 30 is present in the closed position shown in FIG. 1, the cable 15 is clamped in the cable passage 19 and the locking apertures 37 of the first locking section 35 are flush with the locking apertures 37 of the second locking section 36. In this position, the actuation lever 30 can be fixed to the housing 13 by means of one or more—up to six—padlocks (not shown).

The actuation lever 30 acts on the clamping device 33 in such a way that the cable 15 is clamped when the actuation lever 30 is present in the closed position in accordance with FIG. 1. If the actuation lever 30 is not fixed to the housing 13 by means of padlocks, it can, starting from the closed position, be pivoted by 90° into the open position shown in FIG. 2 in which open position the cable 15 can be freely pivoted in the cable passage 19 in both directions E and K.

As is shown, the section of the actuation lever 30 close to the axis is arranged in a cut-out 31 formed in the housing 13, wherein the pivot movement of the actuation lever 30 about the adjustment axis V is bound in both pivot directions by wall sections of the cut-out 31. Furthermore, latching noses 32 are provided at the base of the cut-out 31 which snap into latching depressions (not shown) at the actuation lever 30 in order to latch the actuation lever to the housing 13 in the open position and in the closed position.

The cable locking system 11 in accordance with the invention serves for the locking of machines, of devices or of plants on servicing, cleaning or maintenance, wherein the free end 17B of the cable 15 is initially led around the components to be locked and/or led through corresponding openings and is subsequently introduced into the cable passage 19 of the housing 13 until it is seated tightly, with an actuation lever 30 present in the open position. The actuation lever 30 is then pivoted into the closed position and the padlocks are attached to the locking apertures 37. If necessary, a retightening can take place. After completion of the servicing work, cleaning work or maintenance work, the removal of the cable locking system 11 from the corresponding plant takes place with a reverse order of the steps.

Due to the weight of the prolongation 35 and of the padlocks, the housing 13 is in a certain sense raised during a locking such that it is easily recognizable and additionally provides a tagout function. In order to achieve a strong signalling effect, parts of the housing 13 and in particular of the actuation lever 30 can be coloured red. From the point of view of user friendliness, it can also be advantageous to colour the two limbs to be pivoted with respect to one another, that is the actuation lever 30, on the one hand, and the prolongation 35, on the other hand, in different colours. The opening direction and simultaneously the cable direction of introduction E out of and/or into the closed position is indicated at the actuation lever 30 in the form of an arrow.

Figure 3:
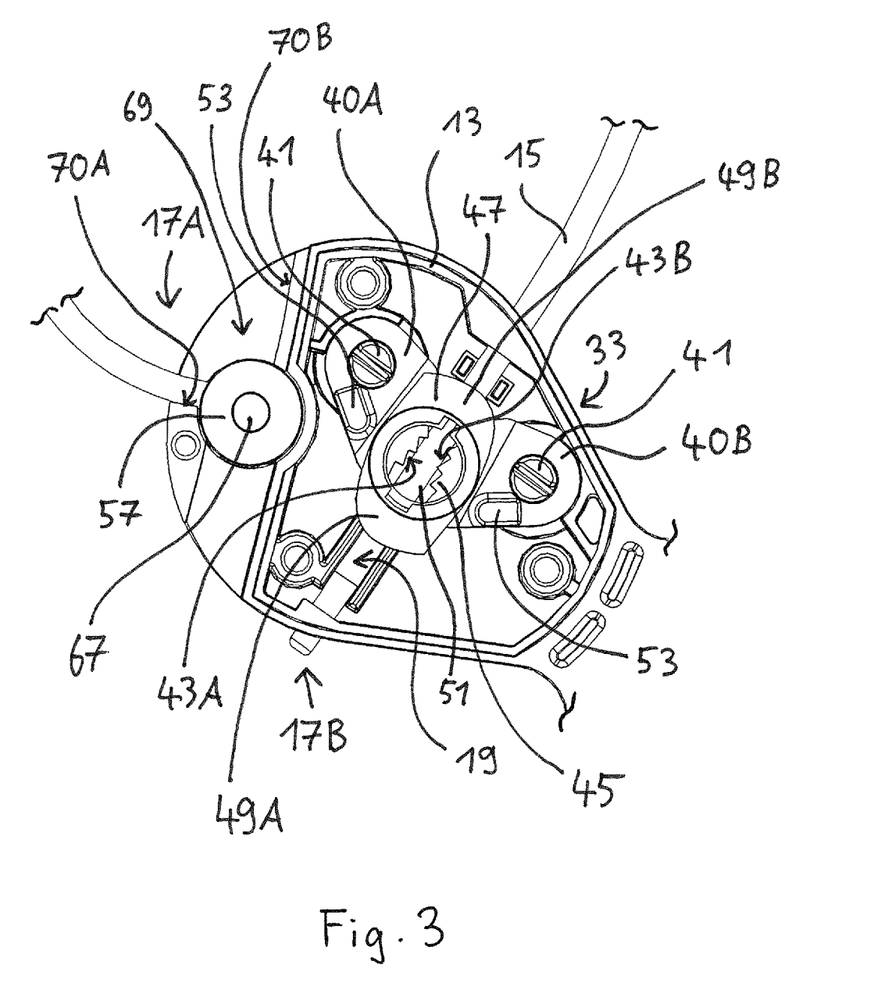
FIG. 3 is an enlarged partial illustration of the cable locking system shown in FIG. 1 in a broken away plan view.
Figure 4:
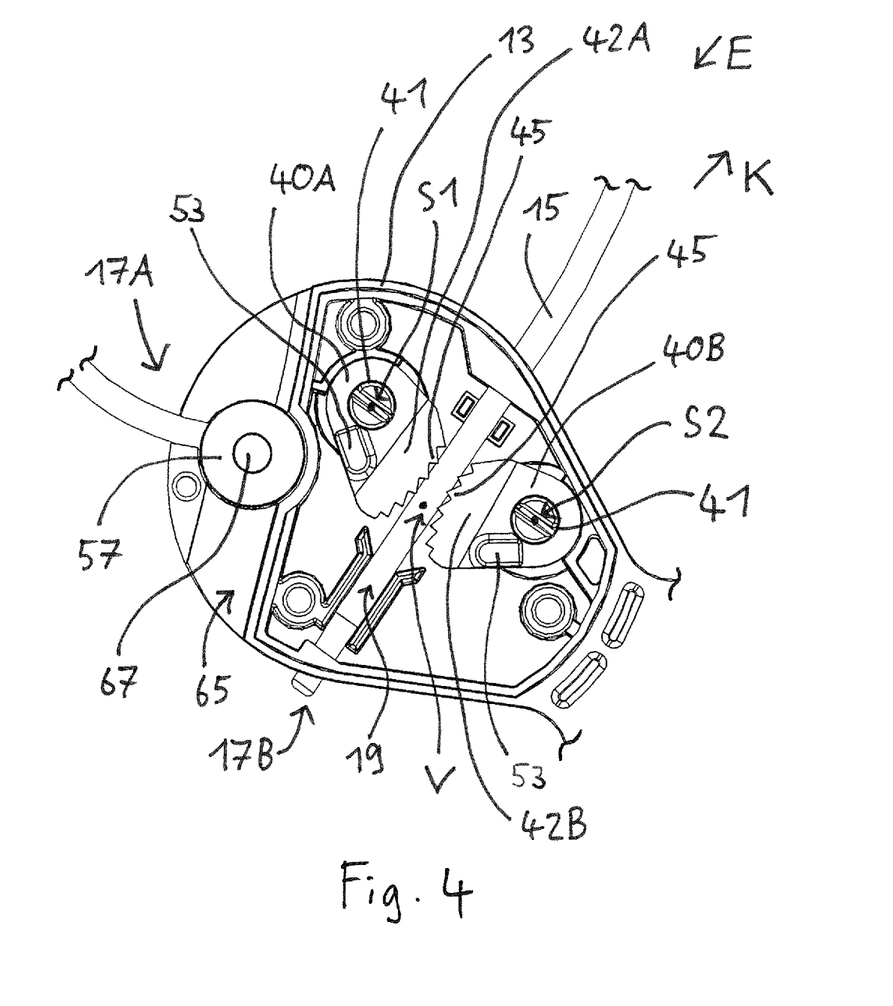
FIG. 4 corresponds to the illustration in accordance with FIG. 3, with a cam disk being omitted.
Figure 5:
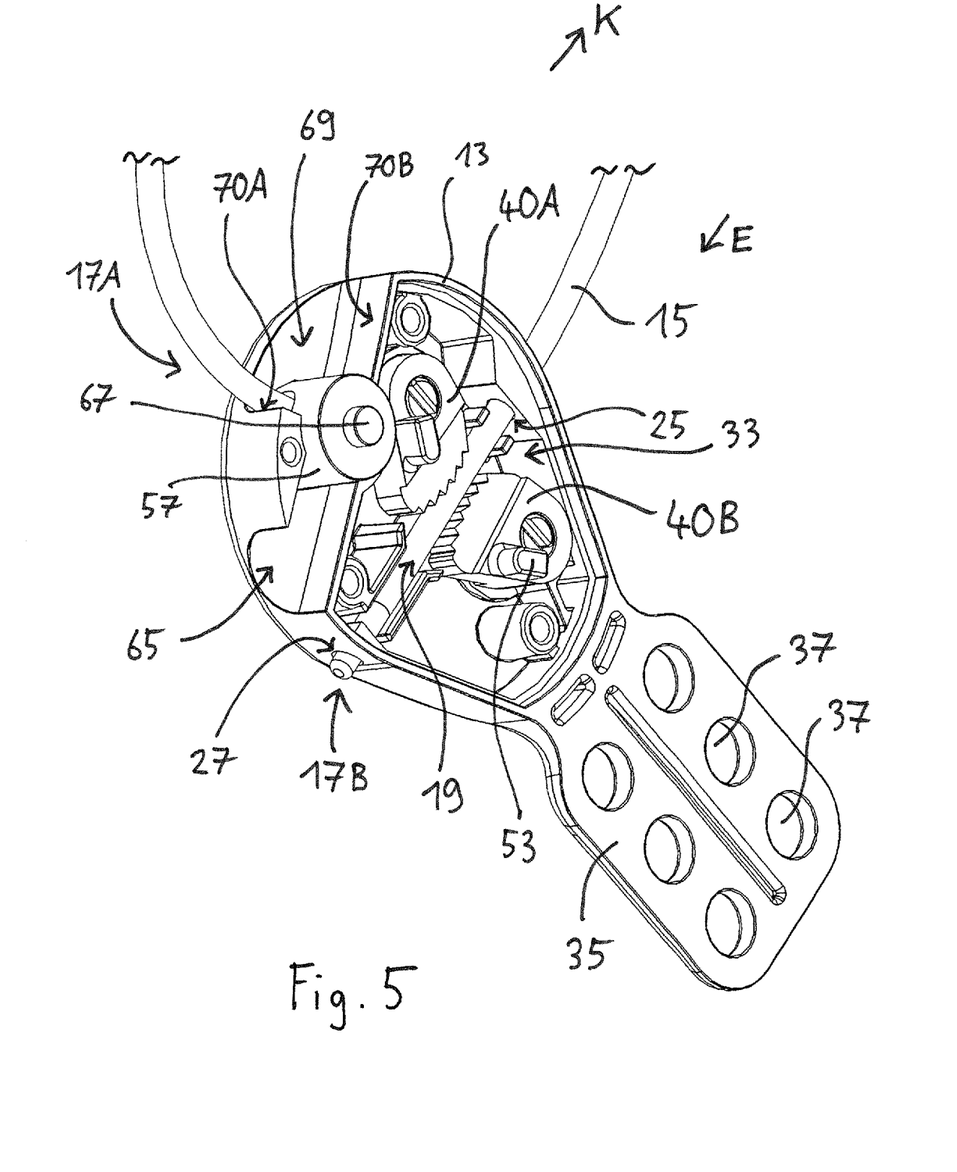
FIG. 5 shows the arrangement shown in FIG. 4 in a perspective view.
Figure 6:
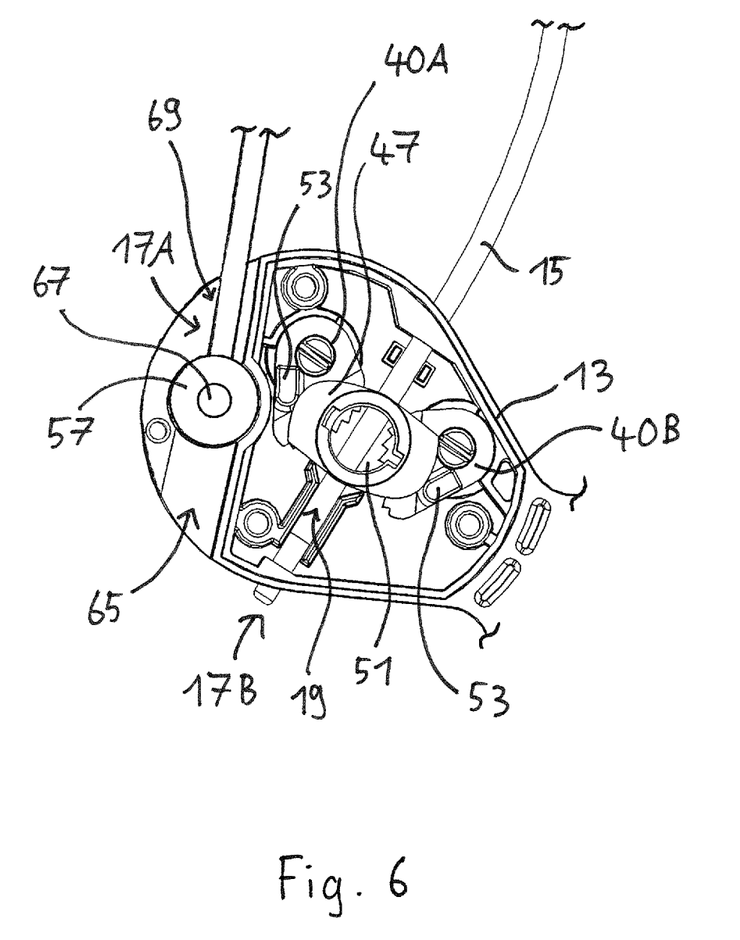
FIG. 6 is an enlarged partial illustration of the cable locking system shown in FIG. 2 in a broken away plan view.
Figure 7:
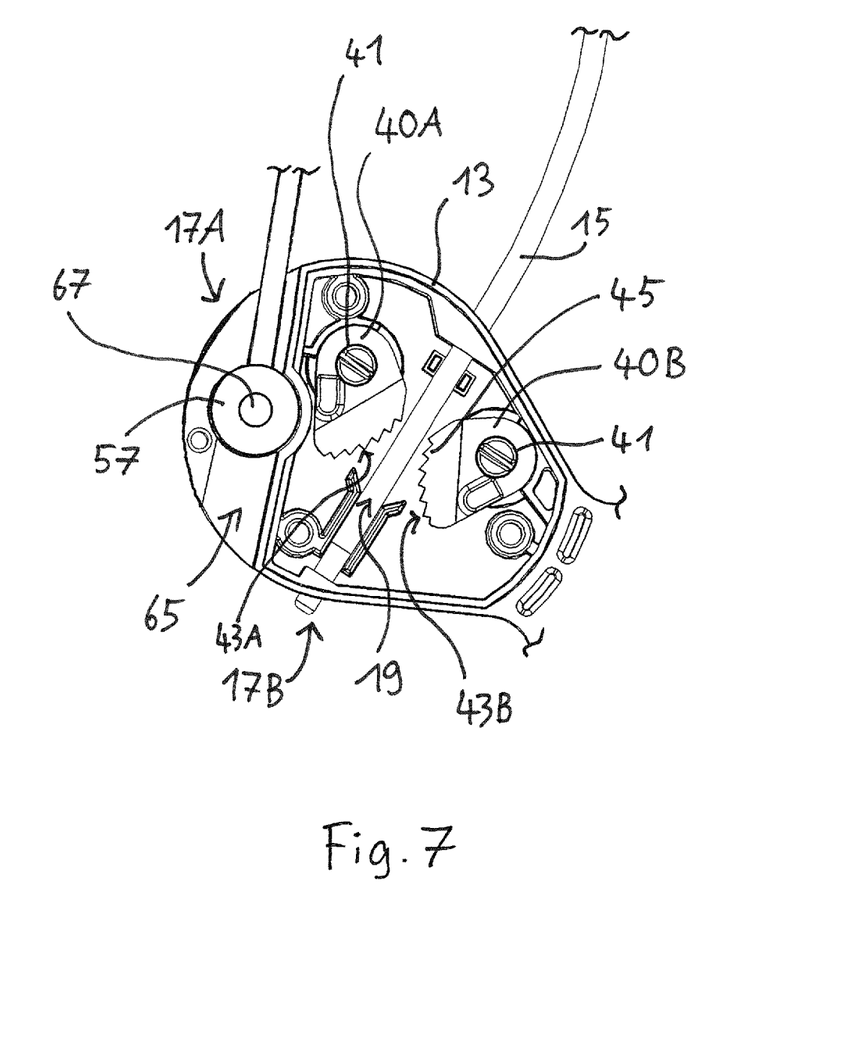
FIG. 7 corresponds to the illustration in accordance with FIG. 6, with the cam disk being omitted.
Figure 8:
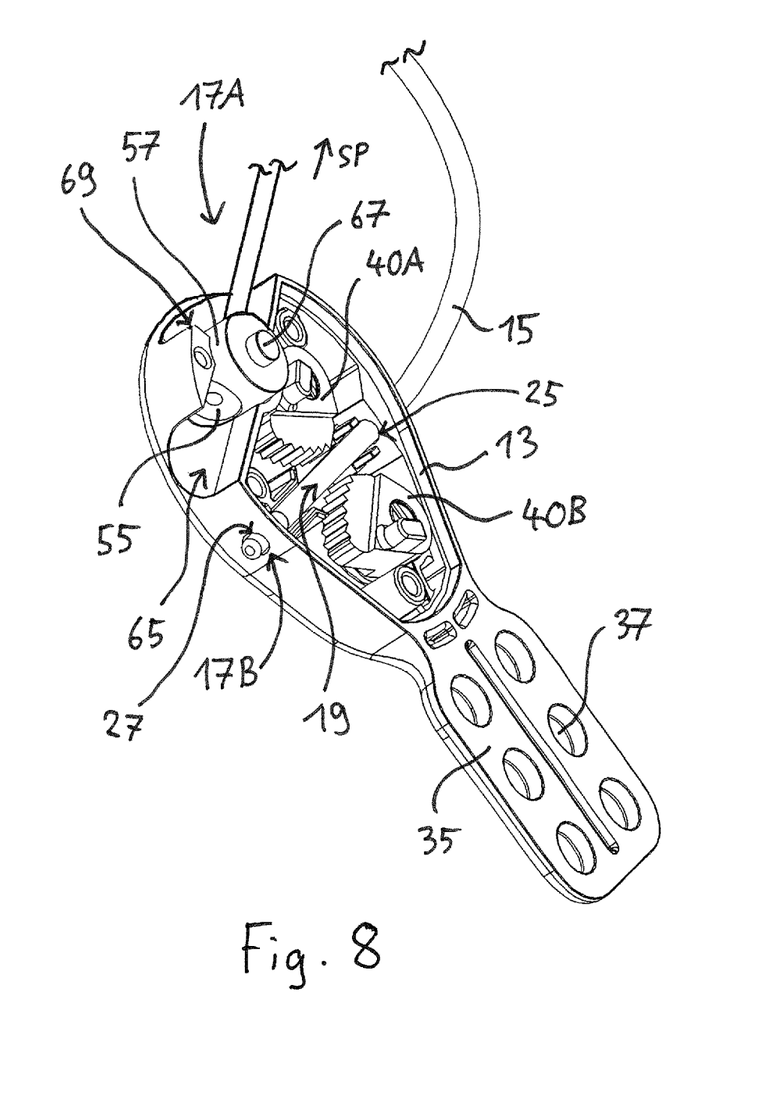
FIG. 8 shows the arrangement shown in FIG. 7 in a perspective view.

The clamping device 33 will be described in more detail in the following with reference to FIGS. 3 to 8. The clamping device 33 is specifically designed in the manner of a bulldog cam cleat and comprises two clamp jaws 40A, 40B which are arranged at both sides of the cable passage 19 and which are each pivotable between a holding position clamping the cable 15 between them—as shown in FIGS. 3 to 5—and a release position releasing the cable 15—as shown in FIGS. 6 to 8. The clamp jaws 40A, 40B are supported at fixed support spigots 41 which are provided at the housing 13 and which, as shown, have a divided latch section. The longitudinal axes of the support spigots 41 correspond to the respective pivot axes S1, S2 (FIG. 4) of the clamp jaws 40A, 40B. The adjustment axis V extends between and in parallel with the pivot axes S1, S2.

The clamp jaws 40A, 40B each have an eccentric cam 42A, 42B which defines a cable clamping surface 43A, 43B. The cable clamping surfaces 43A, 43B are toothed and each have a convexly curved progression in a sectional plane extending transversely with respect to the corresponding pivot axis S1, S2. As can be recognized in FIG. 4, the teeth 45 provided at the cable clamping surfaces 43A, 43B are set against the cable removal direction K.

The clamp jaws 40A, 40B are preloaded in the direction of the cable 15 by respective round springs which are not visible in the Figures and which are arranged beneath the clamp jaws 40A, 40B. Furthermore, a cam disk 47 (FIG. 3) is provided which is connected in a drive effective manner to the adjustment lever 30, which is supported at the housing 13 rotatable about the adjustment axis V and which comprises two cams 49A, 49B disposed opposite with respect to the adjustment axis V. The cam disk 47 has a central leadthrough 51 whose boundary is profiled for a rotationally fixed engagement of a shaft (not shown) extending from the actuation lever 30. Furthermore, the cam disk 47 is axially fixedly held at the shaft of the actuation lever 30 via a circlip which is likewise not shown. At the end face, respective projections 53 extend from the clamp jaws 40A, 40B which are, as shown, rounded off toward the cam disk 47.

It can be seen from FIG. 3 that the cams 49A, 49B of the cam disk 47 do not contact the projections 53 of the clamp jaws 40A, 40B with an actuation lever 30 present in the closed position. The clamp jaws 40A, 40B are thus pressed under free action of the spring force in the direction of the cable 15, where they adopt a clamping holding position. On a displacement of the actuation lever 30 into the open position, the cams 49A, 49B move into a sliding engagement with the projections 53 and thereby press the clamp jaws 40A, 40B apart against the spring force until said clamp jaws are in a release position, that is have been pivoted out of the cable passage 19 (FIG. 7). It is understood that a displacement of the cable 15 in the direction of introduction E is also possible with contacting clamp jaws 40A, 40B. On a tension at the cable 15 in the cable removal direction K, the clamp jaws 20 40A, 40B, in contrast, wedge at the cable 15—and indeed wedge more and more as the tension increases.

Figure 9:
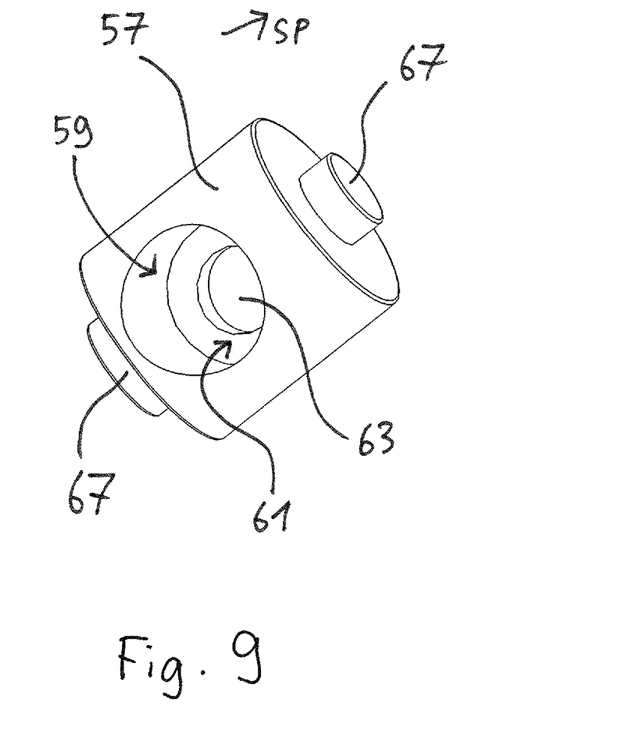
FIG. 9 shows a receiving sleeve of a cable locking system in accordance with the invention in a perspective individual illustration.

The end 17A of the cable 15 disposed at the left in the Figures is, as mentioned, fastened to the housing 13. However, if necessary, it can be released from the housing 13, e.g. on a desired cable exchange. A head part 55 (FIG. 8) is specifically fastened, for example screwed or welded, to the end 17B of the cable 15 provided for the releasable fastening to the housing 13. This head part 55 is arranged in a holding sleeve 57 which is individually shown in FIG. 9. A receiver 59 for the head part 55 is formed in the holding sleeve 57, and has a base 61 having a leadthrough 63 which is just sufficient for the leading through of the cable 15.

Since the head part 55 does not fit through the leadthrough 63, the cable 15 cannot be pulled out of the receiver 59 in a direction of assembly SP. This is, however, generally possible away from the direction of assembly SP.

In order to be able to move the head part 55 out of the receiver 59 and out of the housing 13, a removal opening 65 is provided at the housing through which opening the end 17A of the cable 15 fastened to the housing 13, including the head part 55, can be moved out of the housing 13 away from the direction of assembly SP.

For this purpose, the holding sleeve 57 is pivotably supported in the housing by means of spigot-like projections 67 such that it is pivotable between an operating position shown in FIGS. 3 to 5 and an assembly position shown in FIGS. 6 to 8. A pushing out of the head part 55 out of the holding sleeve 57 and out of the housing 13 is only possible in the assembly position.

In order to allow a pivot movement of the end 17A of the cable 15 fastened to the housing 13, the housing further comprises a pivot recess 69 for the end 17A of the cable 15 provided for the releasable fastening to the housing. Boundary sections 70A, 70B (FIG. 5) of the pivot recess 69 hereby form abutments for the cable 15 and thereby provide for a limitation of the pivot movement of the holding sleeve 57 to an angular range of approximately 90°, provided that the end 17A of the cable 15 is fastened to the housing 13.

For a cable exchange, the clamp jaws 40A, 40B are initially pivoted out of the cable passage 19 and the holding sleeve 57 is then pivoted into the assembly position via the end 17A of the cable 15. The end 17A of the cable 15, with the head part 55 at the front, is subsequently led through the removal opening 65 and out of the housing 13 against the direction of assembly SP. The cable 15 can then be completely drawn through the housing 13 and be removed from the housing. A new cable provided with a head part, in particular a cable of a different length, can subsequently be threaded into the holding sleeve 57 in the direction of assembly SP and after the pivoting of the holding sleeve 57 back into the operating position, as described above, can be used with the cable locking system 11.

Due to the specific design of the housing 13, the purpose of use of the cable locking system 11 in accordance with the invention is revealed to a user at first glance. A particular advantage consists therein that the visual appearance of the cable locking system 11 is reminiscent of a classic safety hasp which is generally known within the framework of the tagout/lockout. As is the case for such a safety hasp, up to six padlocks can be received in such a cable locking system 11 in accordance with the invention, whereas at the most four keys can be attached in conventional cable locking systems.

A safe and intuitive operability is of great importance for cable locking systems, since repairs and cleanings frequently occur in an unplanned and sudden manner. The described cable locking system 11 in accordance with the invention does not require an explanation, since the purpose of use and also the operation can be directly recognized. Incorrect applications, operating errors and time losses are specifically avoided by the design of the cable locking system 11 in accordance with the invention which is particularly important for safety-relevant lockout measures.

LIST OF REFERENCE NUMERALS 11 cable locking system
13 housing
15 cable
17A, 17B end
19 cable passage
25 introduction opening
27 exit opening
30 actuation lever
31 cut-out
32 latching nose
33 clamping device
34 intermediate section
35 first locking section
36 second locking section
37 locking aperture
40A, 40B clamp jaw
41 support spigot
42A, 42B eccentric cam
43A, 43B cable clamping surface
45 tooth
47 cam disk
49A, 49B cam
51 leadthrough
53 projection 55 head part
57 holding sleeve
59 receiver
61 base
63 leadthrough
65 removal opening
67 projection
69 pivot recess
70A, 70B boundary section
72 head section
V adjustment axis
E direction of introduction
K cable removal direction
S1, S2 pivot axis
SP direction of assembly

The invention claimed is:

1. A cable locking system, comprising:
a housing;
a cable whose one end is fastened or fastenable to the housing and whose other end can be introduced into a cable passage formed in the housing;
a clamping device for clamping the cable in the cable passage in order to stop a displacement of the cable in the cable passage in at least a cable removal direction; and
an actuation element which is associated with the clamping device and which is adjustable between a closed position, in which the actuation element can be fixed to the housing by means of locking elements and an open position in order selectively to adjust at least one clamp jaw of the clamping device between a holding position clamping the cable in the cable passage and a release position releasing the cable,
wherein the adjustment of the at least one clamp jaw between the holding position and the release position comprises a pivot movement about a respective pivot axis, and
wherein the clamping device comprises at least two clamp jaws which are arranged at both sides of the cable passage and are each pivotable between a holding position clamping the cable in the cable passage and a release position releasing the cable.

2. The cable locking system in accordance with claim 1, wherein the at least one clamp jaw comprises an eccentric cam having a clamp jaw surface which has a convexly curved progression in a sectional plane extending transversely with respect to the pivot axis.

3. The cable locking system in accordance with claim 2, wherein the cable clamping surface has grooves and/or teeth.

4. The cable locking system in accordance with claim 1, wherein the clamping device is configured so that, in the holding position, a displacement of the cable is blocked in the cable removal direction and is possible against the cable removal direction.

5. The cable locking system in accordance with claim 4, wherein the at least one clamp jaw is preloaded by a spring device in the direction of the holding position.

6. The cable locking system in accordance with claim 1, wherein the adjustment of the actuation element between the closed position and the open position comprises a pivot movement about an adjustment axis.

7. The cable locking system in accordance with claim 6, wherein the actuation element is configured as an actuation lever pivotable about the adjustment axis.

8. The cable locking system in accordance with claim 6, wherein the adjustment axis extends in parallel with the at least one pivot axis of the at least one clamp jaw.

9. The cable locking system in accordance with claim 6, wherein the actuation element is at least partly arranged in a cut-out formed in the housing, with the pivot movement of the actuation element about the adjustment axis being bound in at least one direction by a respective wall section of the cut-out.

10. The cable locking system in accordance with claim 6, wherein an adjustment element is provided which is connected in a drive effective manner to the actuation element and which is supported at the housing rotatable about the adjustment axis, having at least one cam, with the adjustment element cooperating with the respective clamp jaw by a respective cam in such a way that, on a pivoting of the actuation element into the open position, the respective clamp jaw is pivoted into the release position.

11. The cable locking system in accordance with claim 10, wherein the respective cam of the adjustment element does not contact the respective clamp jaw when the actuation element is present in the closed position.

12. The cable locking system in accordance with claim 10, wherein the adjustment element comprises two cams disposed opposite with respect to the adjustment axis.

13. The cable locking system in accordance with claim 10, wherein, at an end face of the at least one clamp jaw, a projection is arranged with which the cam of the adjustment element cooperates.

14. The cable locking system in accordance with claim 10, wherein the actuation element comprises a shaft whose longitudinal axis corresponds to the adjustment axis, with the rotatable adjustment element being rotationally fixedly connected to the shaft, and/or being axially fixedly held at the shaft via a securing element.

15. The cable locking system in accordance with claim 1, wherein the actuation element can be latched to the housing in the open position and/or in the closed position.

16. The cable locking system in accordance with claim 1, wherein the actuation element comprises a plurality of locking apertures which are flush with corresponding locking apertures formed in a locking section of the housing when the actuation element is present in the closed position such that the actuation element can be fixed to the housing by means of locking elements.

17. The cable locking system in accordance with claim 1, wherein the one end of the cable can be releasably fastened to the housing.

18. The cable locking system in accordance with claim 17, wherein a head part is fastened to the end of the cable provided for the releasable fastening to the housing, wherein, in a direction of assembly, the cable, but not the head part, can be led through a receiver for the end of the cable provided with the head part, said receiver being formed in a holding device of the housing.

19. The cable locking system in accordance with claim 18, wherein the holding device comprises a holding element in which the receiver is formed and which is pivotably supported in the housing between an operating position and an assembly position.

20. A cable locking system in accordance with claim 19, wherein a pivot recess is formed in the housing for the end of the cable provided for the releasable fastening to the housing, which pivot recess is sufficiently large to allow a pivot movement of the end of the cable fastened to the housing.

21. The cable locking system in accordance with claim 20, wherein boundary sections of the pivot recess form abutments for the cable and thereby bound the pivot movement of the holding element when the end of the cable is fastened to the housing.

22. The cable locking system in accordance with claim 19, wherein, in the housing, a removal opening is formed through which, in the assembly position of the holding element, the head part can be removed together with the cable from the housing away from the direction of assembly.

23. The cable locking system in accordance with claim 18, wherein a plurality of cables of different lengths are provided which are selectively releasably fastenable to the housing by means of the respective one end.

24. A cable locking system, comprising:
  a housing;
  a cable whose one end is fastened or fastenable to the housing and whose other end can be introduced into a cable passage for in the housing;
  a clamping device for clamping the cable in the cable passage in order to stop a displacement of the cable in the cable passage in at least one cable removal direction; and
  an actuation element which is associated with the clamping device and which is adjustable between a closed position, in which the actuation element can be fixed to the housing by means of locking elements and an open position in order selectively to adjust at least one clamp jaw of the clamping device between a holding position clamping the cable in the cable passage and a release position releasing the cable,
  wherein the housing comprises a head section and a first locking section which is connected to the head section via an intermediate section and which is formed as a plate-shaped prolongation, wherein the clamping device is arranged in the head section and locking apertures are formed in the first locking section, and wherein the actuation element is configured as an actuation lever which is pivotable about an adjustment axis and which comprises, at one free end, a plate-shaped second locking section having a plurality of locking apertures formed therein which are flush with the locking apertures of the first locking section when the actuation lever is present in the closed position, such that the actuation lever can be fixed to the housing by means of the locking elements,
  wherein the head section is rounded in circular form in a plane extending at least substantially perpendicular to the adjustment axis over an angular range of more than 180°.

25. The cable locking system in accordance with claim 24, wherein the two locking sections are at least of substantially identical design and/or each have a rectangular shape.

26. The cable locking system in accordance with claim 24, wherein in comparison with the head section and with the first locking section, the intermediate section has a reduced width in a plane extending perpendicular to the adjustment axis and in a direction extending perpendicular to the longitudinal direction of the actuation element present in the closed position.

27. A cable locking system, comprising:
  a housing;
  a cable whose one end is fastened or fastenable to the housing and whose other end can be introduced into a cable passage formed in the housing;
  a clamping device for clamping the cable in the cable passage in order to stop a displacement of the cable in the cable passage in at least a cable removal direction; and
  an actuation element which is associated with the clamping device and which is adjustable between a closed position, in which the actuation element can be fixed to the housing by means of locking elements and an open position in order selectively to adjust at least one clamp jaw of the clamping device between a holding position clamping the cable in the cable passage and a release position releasing the cable,
  wherein the adjustment of the at least one clamp jaw between the holding position and the release position comprises a pivot movement about a respective pivot axis,
  wherein the adjustment of the actuation element between the closed position and the open position comprises a pivot movement about an adjustment axis, and
  wherein an adjustment element is provided which is connected in a drive effective manner to the actuation element and which is supported at the housing rotatable about the adjustment axis, having two cams disposed opposite with respect to the adjustment axis, with the adjustment element cooperating with the respective clamp jaw by a respective one of the two cams so that, on a pivoting of the actuation element into the open position, the respective clamp jaw is pivoted into the release position.

* * * * *